US008800627B2

(12) United States Patent
Matsuhashi

(10) Patent No.: US 8,800,627 B2
(45) Date of Patent: Aug. 12, 2014

(54) TRANSFER MEDIUM MANUFACTURING METHOD, TRANSFER METHOD, TRANSFER MEDIUM MANUFACTURING APPARATUS, AND TRANSFER APPARATUS

(75) Inventor: Kunihiko Matsuhashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 377 days.

(21) Appl. No.: 12/852,890

(22) Filed: Aug. 9, 2010

(65) Prior Publication Data

US 2011/0033611 A1 Feb. 10, 2011

(30) Foreign Application Priority Data

Aug. 10, 2009 (JP) ................................. 2009-185927

(51) Int. Cl.
*B32B 41/00* (2006.01)
*B05C 11/00* (2006.01)

(52) U.S. Cl.
USPC ............ 156/358; 156/359; 156/367; 156/541

(58) Field of Classification Search
USPC .......... 156/358, 359, 367, 541; 118/666, 667, 118/692
See application file for complete search history.

(56) References Cited

U.S. PATENT DOCUMENTS

2005/0236097 A1* 10/2005 Matsuhashi et al. .......... 156/235
2007/0056451 A1* 3/2007 Klann ............................. 101/32
2009/0080949 A1 3/2009 Yamanobe et al.
2009/0183672 A1* 7/2009 Nagahara et al. ............. 118/256

FOREIGN PATENT DOCUMENTS

JP 2004-247572 9/2004
JP 2007-078805 3/2007
JP 2008-188865 8/2008
JP 2009-078391 4/2009

* cited by examiner

*Primary Examiner* — George Koch
(74) *Attorney, Agent, or Firm* — Workman Nydegger

(57) ABSTRACT

A transfer medium manufacturing method for manufacturing a transfer medium in which a foil forming recording material containing metallic particles capable of being transferred onto a target has been applied to a base material includes: applying the foil forming recording material to the base material; and smoothing the surface of the foil forming recording material applied to the base material in the applying, the foil forming recording material being in a partially-melted state.

6 Claims, 4 Drawing Sheets

TRANSFER MEDIUM MANUFACTURING METHOD, TRANSFER METHOD, TRANSFER MEDIUM MANUFACTURING APPARATUS, AND TRANSFER APPARATUS

BACKGROUND

1. Technical Field

The present invention relates to a transfer medium manufacturing method for manufacturing a transfer medium by applying a foil forming recording material, containing metallic particles capable of being transferred onto a target, to a base material, a transfer method that uses a transfer medium manufactured through the stated transfer medium manufacturing method, a transfer medium manufacturing apparatus, and a transfer apparatus.

2. Related Art

Thermal transfer apparatuses are widely known as a type of transfer apparatus that transfers a recording material from a transfer medium onto a target (for example, see JP-A-2008-188865). The thermal transfer apparatus disclosed in JP-A-2008-188865 includes a printing unit that forms an image by ejecting ink (a foil forming recording material) onto an intermediate transfer recording medium (a transfer medium) and a transfer section that heat-transfers the image formed by the printing unit from the intermediate transfer recording medium onto a transfer target medium (a target). According to this thermal transfer apparatus, first, the printing unit forms an ink-based image pattern upon the intermediate transfer recording medium by ejecting ink onto the intermediate transfer recording medium. Next, the transfer section heat-transfers the ink-based image pattern from the intermediate transfer recording medium to the transfer target medium by applying heat to the intermediate transfer recording medium in a state in which the intermediate transfer recording medium and the transfer target medium are superposed.

Incidentally, techniques have recently been proposed whereby in, for example, a thermal transfer apparatus such as that disclosed in JP-A-2008-188865, metallic inks containing metallic particles are employed as the inks ejected by the printing unit onto the intermediate transfer recording medium, and metallic ink-based metallic foils are transferred from the intermediate transfer recording medium to the transfer target medium.

However, there may be situations where, when the printing unit ejects a metallic ink onto the intermediate transfer recording medium, the metallic ink hardens upon the surface of the intermediate transfer recording medium in a bumpy state. Note that the surface on which such bumps are formed by the metallic ink is the contact surface where the metallic ink makes contact with the transfer target medium when the metallic ink is transferred onto the transfer target medium. There has thus been the risk that if the metallic ink is transferred onto the transfer target medium in a state in which the contact surface has poor planarity relative to the transfer target medium, the metallic foil formed upon the transfer target medium by the metallic ink will have insufficient glossiness when viewed over the transfer target medium.

SUMMARY

An advantage of some aspects of the invention is to provide a transfer medium manufacturing method, a transfer method, a transfer medium manufacturing apparatus, and a transfer apparatus capable of achieving sufficient glossiness in a metallic foil transferred from a transfer medium onto a target.

A transfer medium manufacturing method according to an aspect of the invention is a transfer medium manufacturing method for manufacturing a transfer medium in which a foil forming recording material containing metallic particles capable of being transferred onto a target has been applied to a base material, and includes: applying the foil forming recording material to the base material; and smoothing the surface of the foil forming recording material, the foil forming recording material having been applied to the base material in a partially-melted state in the applying.

According to the aforementioned configuration, the surface of the foil forming recording material, which is in a partially-melted state, is smoothed by a smoothing unit in a smooth manner. Note that the surface of the foil forming recording material that is smoothed by the smoothing unit is the surface that makes contact with the target. Accordingly, transferring the foil forming recording material onto the target as a metallic foil makes it possible to obtain a metallic foil that has sufficient glossiness when viewed over the target.

A transfer method according to an aspect of the invention includes: applying a foil forming recording material containing metallic particles to a base material; smoothing the surface of the foil forming recording material applied to the base material in the applying, the foil forming recording material being in a partially-melted state; and transferring the foil forming recording material whose surface has been smoothed in the smoothing from the base material onto a target.

According to this configuration, the same effects as those of the aforementioned transfer medium manufacturing method can be achieved.

A transfer medium manufacturing apparatus according to an aspect of the invention is a transfer medium manufacturing apparatus for manufacturing a transfer medium in which a foil forming recording material containing metallic particles capable of being transferred onto a target has been applied to a base material, and includes: a recording material application unit that applies the foil forming recording material to the base material; and a smoothing unit that smoothes the surface of the foil forming recording material applied to the base material by the recording material application unit.

According to this configuration, the same effects as those of the aforementioned transfer medium manufacturing method can be achieved.

Meanwhile, in the transfer medium manufacturing apparatus according to an aspect of the invention, the smoothing unit includes a pressing unit capable of applying pressure to the foil forming recording material that has been applied to the base material, and a biasing unit that biases the pressing unit toward the foil forming recording material; a biasing force applied to the pressing unit by the biasing unit is adjusted in accordance with the application state of the foil forming recording material on the base material.

According to this configuration, in the case where, for example, the foil forming recording material forms a complex recorded image upon the base material, the biasing force applied to the pressing unit by the biasing unit is reduced. As a result, the pressing unit presses weakly upon the recorded image, and thus the form of the complex recorded image upon the base material remains almost undisturbed. On the other hand, in the case where, for example, the foil forming recording material forms a simple recorded image upon the base material, the biasing force applied to the pressing unit by the biasing unit is increased. As a result, the pressing unit presses strongly upon the recorded image, thus making it possible to smooth the surface of the foil forming recording material with more certainty.

In addition, the transfer medium manufacturing apparatus according to an aspect of the invention further includes: a transport unit that transports the base material so that a region of the base material on which the foil forming recording material has been applied moves toward the smoothing unit; a temperature detection unit, provided between the recording material application unit and the smoothing unit in a transport path of the base material, that detects the temperature of the surface of the base material on which the foil forming recording material is applied; and a drying unit, provided between the temperature detection unit and the smoothing unit in the transport path of the base material, that dries the region of the base material on which the foil forming recording material has been applied. A drying condition for the foil forming recording material is set in the drying unit based on a result of the detection performed by the temperature detection unit.

According to this configuration, to what degree the foil forming recording material applied to the base material will be dried can be predicted prior to the foil forming recording material entering into the drying unit based on the temperature of the surface in the base material to which the foil forming recording material has been applied. The drying conditions for the foil forming recording material can then be set in the drying unit by referring to the results of this prediction. As a result, the foil forming recording material that has been applied to the base material can be put into a partially-melted state with certainty at the point where the foil forming recording material enters into the smoothing unit.

In addition, a transfer apparatus according to an aspect of the invention includes the transfer medium manufacturing apparatus configured as described above, and a transfer unit that transfers the foil forming recording material from the transfer medium manufactured by the transfer medium manufacturing apparatus onto the target.

According to this configuration, the same effects as those of the aforementioned transfer medium manufacturing apparatus can be achieved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a transfer apparatus serving as a specific embodiment of the invention will be described based on the drawings. Note that the terms "longitudinal direction," "horizontal direction," and "vertical direction" used in the following descriptions are based on the directions indicated by arrows in FIG. 1.

Figure 1:
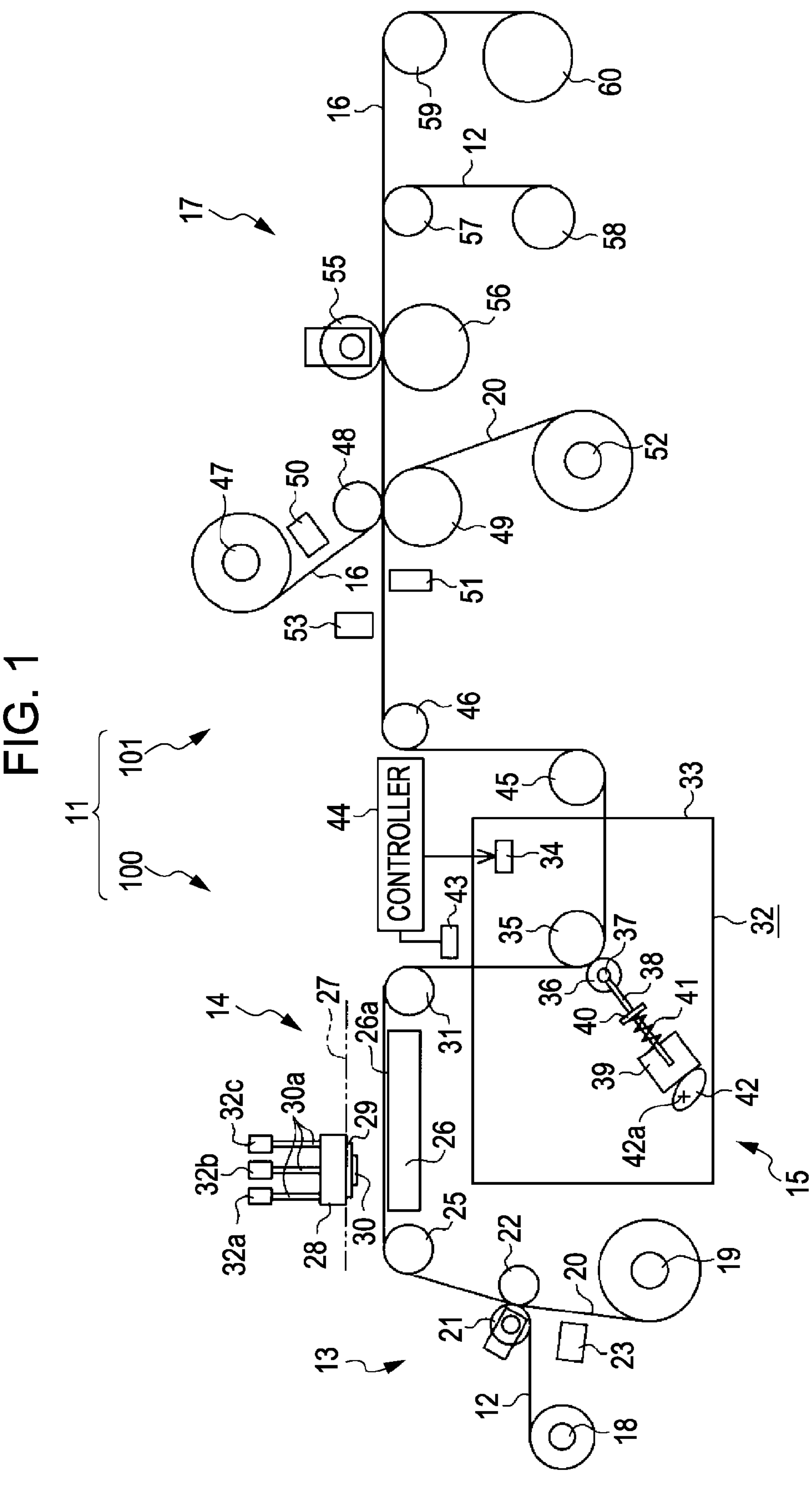
FIG. 1 is a schematic diagram illustrating a transfer apparatus according to an embodiment of the invention.

As shown in FIG. 1, a transfer apparatus 11 is configured of a transfer medium manufacturing apparatus 100 for manufacturing a transfer medium in which an image pattern has been formed on a base material film 12 serving as a base material, and a transfer unit 101 that transfers the image pattern from the transfer medium manufactured by the transfer medium manufacturing apparatus 100 onto a transfer target medium serving as a target. The transfer medium manufacturing apparatus 100, meanwhile, includes: an unwinding unit 13 that unwinds the base material film 12, which is in the shape of a continuous long sheet; a printing unit 14 that forms the image pattern upon the base material film 12 that has been unwound from the unwinding unit 13; and a drying unit 15 that dries the image pattern formed upon the base material film 12 by the printing unit 14. Meanwhile, the transfer unit 101 includes a transfer section 17 that transfers the image pattern that has been dried upon the base material film 12 by the drying unit 15 onto a transfer target medium 16.

First, the transfer medium manufacturing apparatus 100 will be described.

As shown in FIG. 1, two winding shafts 18 and 19 are provided in the unwinding unit 13 in a freely rotatable state. The base material film 12 and a carrier film 20 that serves as a continuous long sheet-shaped reinforcement material for reinforcing the base material film 12 are held on the winding shafts 18 and 19, respectively, wound up in roll form. Furthermore, a pair of rollers 21 and 22 that pinch the base material film 12 unwound from the winding shaft 18 and the carrier film 20 unwound from the winding shaft 19 in a superposed state are provided in the unwinding unit 13.

An adhesive coater unit 23 is provided between the pair of rollers 21 and 22 and the winding shaft 19 on which the carrier film 20 is wound. The adhesive coater unit 23 forms an adhesive layer 24 by applying an adhesive to an adhesive surface of the carrier film 20 unwound from the winding shaft 19, the adhesive surface being the surface of the carrier film 20 opposed to the base material film 12 (see FIG. 2). The pair of rollers 21 and 22 press-bond the two films 12 and 20 to each other through the adhesive layer 24 formed from the adhesive applied to the carrier film 20 by the adhesive coater unit 23. Note that in this embodiment, a UV (ultraviolet) delamination-type adhesive is used as the adhesive applied to the carrier film 20 by the adhesive coater unit 23.

An intermediate roller 25 is provided in a freely-rotatable state within the printing unit 14, in a position that is to the upper right of the pair of rollers 21 and 22. The base material film 12 and the carrier film 20 unwound from the pair of rollers 21 and 22 are then wound upon the intermediate roller 25 from the lower-left and are transported in the horizontal-right direction.

A quadrangular-shaped platen 26 is provided in the region to the right side of the intermediate roller 25. The upper surface of the platen 26 serves as a support surface 26*a*, which supports the films 12 and 20 that are transported from the intermediate roller 25. Meanwhile, a heater (not shown) for heating the support surface 26*a* is installed within the platen 26.

Furthermore, a guide rail 27 that extends in the horizontal direction is provided above the platen 26. A quadrangular-shaped carriage 28 is supported by the guide rail 27 in a state in which the carriage 28 is capable of moving back and forth in the horizontal direction along the guide rail 27. The carriage 28 moves in the horizontal direction along the guide rail 27 based on a result of driving performed by a driving mechanism (not shown).

A quadrangular-shaped slide plate 29 is supported on the bottom surface of the carriage 28 so as to be capable of sliding in the longitudinal direction relative to the carriage 28. Furthermore, a recording head 30, serving as a recording material application unit, is supported on the bottom surface of the slide plate 29. The recording head 30 is connected to multiple (in this embodiment, three) liquid cartridges 32*a*, 32*b*, and 32*c*, via liquid supply tubes 30*a*. A metallic ink, serving as a foil forming recording material containing metallic particles for forming an image pattern to be transferred onto the transfer target medium 16, is held in the liquid cartridge 32*a*. Meanwhile, an overcoat liquid for protecting the image pattern transferred onto the transfer target medium 16 is held in the liquid cartridge 32*b*. Finally, an adhesive liquid for causing the image pattern to adhere to the transfer target medium 16 is held in the liquid cartridge 32*c*.

Figure 2:
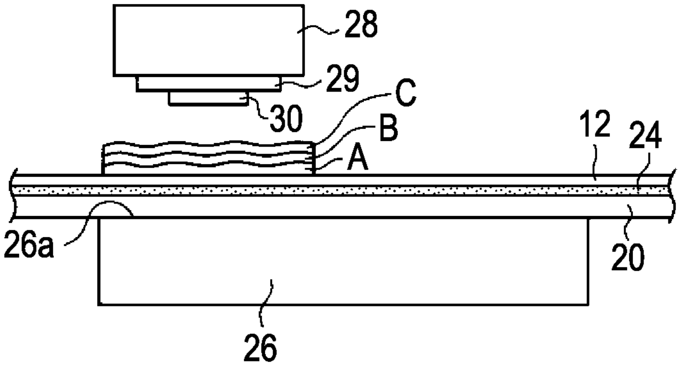
FIG. 2 is a schematic diagram illustrating a state in which an overcoat liquid, a metallic ink, and an adhesive liquid have been ejected from a recording head onto a base material film in a layered state.

Meanwhile, multiple nozzle openings (not shown) are provided in the lower surface of the recording head 30. The recording head 30 ejects the liquids (the metallic ink, the overcoat liquid, and the adhesive liquid) supplied via the liquid supply tubes 30*a* from the liquid cartridges 32*a*, 32*b*, and 32*c* through respective nozzle openings toward the base material film 12, which has been transported onto the support surface 26*a* of the platen 26 and is in a stopped state. Note that in this embodiment, as shown in FIG. 2, the recording head 30 ejects the overcoat liquid, the metallic ink, and the adhesive liquid in that order onto the base material film 12 from the nozzle openings as the carriage 28 carries out scanning, thus forming an overcoat layer A from the overcoat liquid, a metallic ink layer B from the metallic ink, and an adhesive layer C from the adhesive liquid, upon the base material film 12 in a layered state.

A conversion roller 31 is provided in a freely-rotatable state to the right of the platen 26, on the opposite side of the intermediate roller 25 with the platen 26 located therebetween. Note that the upper surface of the conversion roller 31 is uniform with the upper surface of the intermediate roller 25 and the support surface 26*a* of the platen 26. The base material film 12 and the carrier film 20 that are transported in the horizontal-right direction from the intermediate roller 25 and along the support surface 26*a* of the platen 26 are then wound upon the conversion roller 31 from the upper-left. Then, the films 12 and 20 are transported so that the application region of the metallic ink in the base material film 12 approaches the drying unit 15, in a state in which the transport direction of the films 12 and 20 has been converted from the horizontal-right direction to the vertical-downward direction by the conversion roller 31.

A forced drying device 32, serving as a drying unit for forcefully drying the application region of the metallic ink that has been ejected from the recording head 30 in the printing unit 14 onto the base material film 12, is provided in the drying unit 15. The forced drying device 32 includes a housing 33 whose interior is hollow, and a heater 34 is provided within the housing 33. The films 12 and 20 that are transported from the conversion roller 31 in the vertical-downward direction pass through a through-hole (not shown) provided in an upper wall portion of the housing 33 and enter into the interior of the housing 33. Then, after being transported in the horizontal-right direction after being wound, from the upper-left, upon a conversion roller 35 provided in rotatable state in a lower region within the housing 33, the films 12 and 20 pass through a through-hole (not shown) provided in a right wall portion of the housing 33 and are transported outside of the housing 33. In other words, of the films 12 and 20, the recording surface of the base material film 12, in which the overcoat layer A, the metallic ink layer B, and the adhesive layer C have been layered by the printing unit 14, is caused to make contact with the conversion roller 35.

Meanwhile, within the housing 33, a pressure roller 36 serving as a pressing unit is provided opposing the conversion roller 35 with the films 12 and 20 located therebetween. The pressure roller 36 is configured so as to be freely rotatable central to a shaft portion 37 that extends in the longitudinal direction. The pressure roller 36 is capable of pinching the overcoat layer A, the metallic ink layer B, and the adhesive layer C, formed upon the recording surface of the base material film 12 by the printing unit 14, between itself and the conversion roller 35.

Meanwhile, a linking member 38, configured of a rod-shaped rigid body, is linked to the shaft portion 37 of the pressure roller 36 on one end thereof in the lengthwise direction. In addition, an intermediate member 39, configured as a box whose interior is hollow, is provided to the lower-left of the pressure roller 36 within the housing 33. A through-hole (not shown) is formed in an upper wall portion of the intermediate member 39 that opposes the pressure roller 36, and the other end of the linking member 38 in the lengthwise direction enters into the interior of the intermediate member 39 passing through that through-hole.

In addition, a stopping portion 40 is provided at a location midway in the lengthwise direction of the linking member 38. A coil spring 41 is wound around the linking member 38, so as to follow along the lengthwise direction of the linking member 38, in the space between the stopping portion 40 and the upper wall portion of the intermediate member 39 that opposes the pressure roller 36.

Meanwhile, an eccentric cam 42, serving as a biasing unit and having an approximately elliptical shape when viewed from the side, is provided to the lower-left of the intermediate member 39 in the housing 33, and is provided so as to be eccentrically rotatable central to a rotation axis line 42*a*. The outer circumferential surface of the eccentric cam 42, which has an approximately elliptical shape, makes contact with a bottom wall portion of the intermediate member 39, thus supporting the intermediate member 39. By receiving a pressing force from the outer circumferential surface of the eccentric cam 42 in the upper-right direction due to rotation of the eccentric cam 42, the intermediate member 39 displaces relative to the linking member 38 in the lengthwise direction of the linking member 38 so that the coil spring 41 held between the upper wall portion of the intermediate member 39 and the stopping portion 40 of the linking member 38 contracts.

Furthermore, a temperature sensor 43, serving as a temperature detection unit that detects the surface temperature of the base material film 12 that receives the metallic ink ejected from the recording head 30, is provided between the conversion roller 31 and the forced drying device 32 upon the transport path of the films 12 and 20. The temperature sensor 43 is electrically connected to a controller 44. The controller 44 adjusts the temperature of the heat applied by the heater 34 within the housing 33 based on results of the detection performed by the temperature sensor 43.

An intermediate roller 45 is provided in a freely-rotatable state to the right of the conversion roller 35. The films 12 and 20 that are transported from the conversion roller 35 in the horizontal-right direction are then wound upon the intermediate roller 45 from the lower-left and are transported in the vertical-upward direction. A driving roller 46, serving as a transport unit, is provided above the intermediate roller 45 so as to be capable of rotational driving. The films 12 and 20 transported from the intermediate roller 45 in the vertical-upward direction are wound upon the driving roller 46 from below and are then transported toward the transfer section 17 in the horizontal-right direction.

Next, the transfer unit 101 will be described.

As shown in FIG. 1, a winding shaft 47 is provided in a freely-rotatable state in a position within the transfer section 17 that is on the side of the recording surface of the base material film 12. The continuous long sheet-shaped transfer target medium 16 is held upon the winding shaft 47, wound up in a roll. A pair of rollers 48 and 49 that pinch the films 12 and 20 unwound from the driving roller 46 and the transfer target medium 16 unwound from the winding shaft 47 in a superposed state are provided in the transfer section 17. The pair of rollers 48 and 49 press-bond the recording surface of the base material film 12 to the transfer target medium 16.

Note that a position detection sensor 50 that detects the position, in the width direction, of the transfer target medium 16 unwound from the winding shaft 47 is provided between the winding shaft 47 and the pair of rollers 48 and 49. Furthermore, a position detection sensor 51 that detects the position, in the width direction, of the films 12 and 20 unwound from the driving roller 46 is provided between the driving roller 46 and the pair of rollers 48 and 49. The pair of rollers 48 and 49 are capable, based on results of the detection performed by the position detection sensors 50 and 51, of superposing the image pattern formed on the base material film 12 by the printing unit 14 upon the transfer target medium 16 in a state where the image pattern positioned at a desired position.

A take-up drive shaft 52, capable of rotational driving, is provided to the lower-right of the pair of rollers 48 and 49. Of the films 12 and 20 unwound from the driving roller 46, the carrier film 20 is wound upon the take-up drive shaft 52 having separated from the base material film 12. A UV light source 53 that irradiates, of the films 12 and 20 unwound from the driving roller 46, the recording surface of the base material film 12 with UV light is provided between the driving roller 46 and the pair of rollers 48 and 49.

Meanwhile, a pair of transfer rollers 55 and 56, serving as a transfer unit, are provided to the right of the pair of rollers 48 and 49, so as to oppose each other with the base material film 12 and the transfer target medium 16 unwound from the pair of rollers 48 and 49 therebetween. The pair of transfer rollers 55 and 56 pinch the base material film 12 and the transfer target medium 16 unwound from the pair of rollers 48 and 49 while applying heat thereto.

A separation roller 57 is provided in a freely-rotatable state to the right of the pair of transfer rollers 55 and 56. The base material film 12 unwound from the pair of transfer rollers 55 and 56 in the horizontal-right direction is wound upon the separation roller 57 from the upper-left, separated from the transfer target medium 16, and is transported in the vertical-downward direction. A take-up drive shaft 58 is provided below the separation roller 57, capable of rotational driving by being driven by a driving mechanism (not shown). The base material film 12 unwound from the separation roller 57 is then wound upon the take-up drive shaft 58 from above.

An intermediate roller 59 is provided in a freely-rotatable state to the right of the separation roller 57. The transfer target medium 16 unwound from the separation roller 57 in the horizontal-right direction is then wound upon the intermediate roller 59 and is transported in the vertical-downward direction. A take-up drive shaft 60, capable of rotational driving, is provided below the intermediate roller 59. The transfer target medium 16, onto which the image pattern has been heat-transferred from the base material film 12 by the transfer section 17, is wound upon the take-up drive shaft 60 from above.

Next, operations of the transfer apparatus 11 configured as mentioned thus far will be described, with particular focus on operations performed when transferring the image pattern formed using the metallic ink from the base material film 12 onto the transfer target medium 16.

First, as a recording material application step, the recording head 30 in the printing unit 14 ejects the overcoat liquid, the metallic ink, and the adhesive liquid onto the recording surface of the base material film 12 in a layered manner, as shown in FIG. 2. Here, the overcoat layer A formed of the overcoat liquid, the metallic ink layer B formed of the metallic ink, and the adhesive layer C formed of the adhesive liquid are layered upon the recording surface of the base material film 12, in a state in which wave-shaped border surfaces are formed between the layers.

Figures 3A, 3B, 3C:
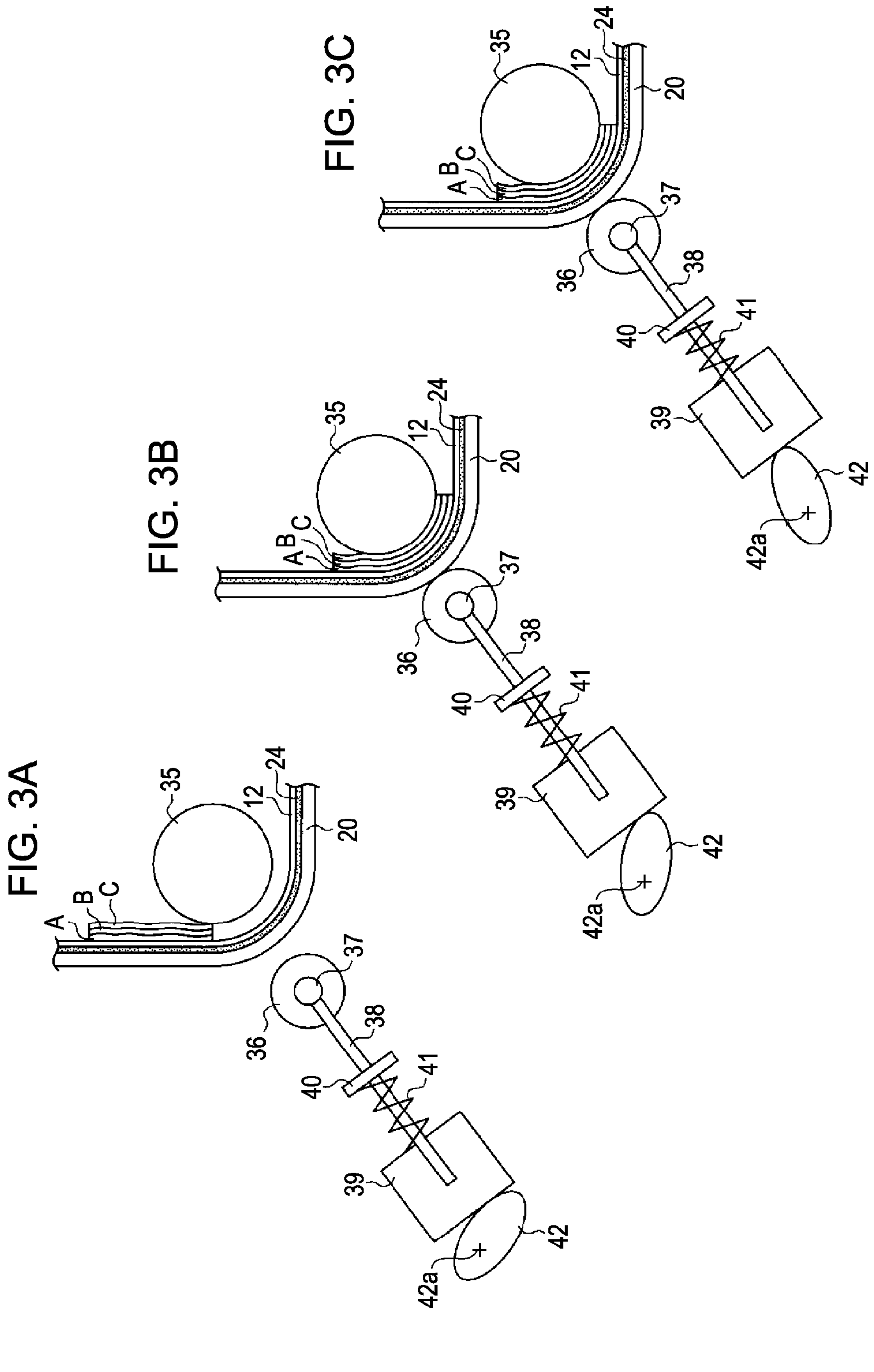
FIG. 3A is a schematic diagram illustrating a state in which a pressure roller is distanced from a carrier film.
FIG. 3B is a schematic diagram illustrating a state in which the pressure roller presses against a base material film and the carrier film.
FIG. 3C is a schematic diagram illustrating a state in which the pressure roller presses even more strongly against the base material film and the carrier film from the state illustrated in FIG. 3B.

Next, as a smoothing step, the eccentric cam 42 is rotationally driven by the pressure roller 36 separated from the carrier film 20 that is wound upon the conversion roller 35, as shown in FIG. 3A. Upon doing so, the eccentric cam 42 rotates in an eccentric manner central to the rotation axis line 42*a*, so that the dimension protruding in the upper-right direction toward the pressure roller 36 expands. The intermediate member 39 is pushed to the upper-right by the outer circumferential surface of the eccentric cam 42, thus approaching the pressure roller 36. As a result, the stopping portion 40 of the linking member 38 is biased in the upper-right direction by the coil spring 41 installed between the stopping portion 40 and the intermediate member 39, in tandem with the displacement of the intermediate member 39 in the upper-right direction. Accordingly, the pressure roller 36 receives a pressing force from the linking member 38 in the upper-right direction, thus approaching the conversion roller 35, and makes contact with the carrier film 20 wound upon the conversion roller 35 as a result.

Next, when the eccentric cam 42 is further rotationally driven, the eccentric cam 42 rotates in an eccentric manner central to the rotation axis line 42*a*, so that the dimension protruding in the upper-right direction toward the pressure roller 36 expands further, as shown in FIG. 3B. The intermediate member 39 is pushed further to the upper-right by the outer circumferential surface of the eccentric cam 42, thus further approaching the pressure roller 36. Here, the pressure roller 36 is in contact with the carrier film 20 wound upon the conversion roller 35, and thus further displacement in the upper-right direction is regulated by the carrier film 20. Furthermore, one end of the linking member 38 in the lengthwise direction is anchored to the shaft portion 37 of the pressure roller 36 so as to be incapable of relative displacement. Accordingly, when the intermediate member 39 displaces in the upper-right direction, the ratio at which the other end of the linking member 38 in the lengthwise direction advances into the intermediate member 39 increases. As a result, the stopping portion 40 of the linking member 38 undergoes relative displacement, thus approaching the intermediate member 39. The coil spring 41 installed between the stopping portion 40 of the linking member 38 and the intermediate member 39 contracts in the lengthwise direction of the linking member 38. Upon doing so, because the stopping portion 40 of the linking member 38 is biased toward the conversion roller 35 by the coil spring 41, the pressure roller 36 and the conversion roller 35 pinch the base material film 12 and the carrier film 20 therebetween.

Furthermore, when the eccentric cam 42 is further rotationally driven, the eccentric cam 42 rotates in an eccentric manner central to the rotation axis line 42$a$, so that the dimension protruding in the upper-right direction toward the pressure roller 36 expands further, as shown in FIG. 3C. The intermediate member 39 is pushed further to the upper-right by the outer circumferential surface of the eccentric cam 42, thus further approaching the pressure roller 36. Meanwhile, when the intermediate member 39 displaces in the upper-right direction, the stopping portion 40 of the linking member 38 undergoes relative displacement, thus further approaching the intermediate member 39. The coil spring 41 installed between the stopping portion 40 of the linking member 38 and the intermediate member 39 then contracts further in the lengthwise direction of the linking member 38. Upon doing so, because the stopping portion 40 of the linking member 38 is more strongly biased toward the conversion roller 35 by the coil spring 41, the pressure roller 36 and the conversion roller 35 pinch more strongly the base material film 12 and the carrier film 20 therebetween.

Here, in the case where a complex image pattern is formed of metallic ink upon the recording surface of the base material film 12 by the printing unit 14, the pressing force on the conversion roller 35 from the pressure roller 36 is set to be comparatively weak. As a result, the conversion roller 35 weakly presses upon the image pattern formed from the metallic ink, thus smoothing the surface of the metallic ink layer B without disturbing the form of the complex image pattern formed upon the base material film 12.

On the other hand, in the case where a simple image pattern (for example, as found in solid printing) is formed of metallic ink upon the recording surface of the base material film 12 by the printing unit 14, the pressing force on the conversion roller 35 from the pressure roller 36 is set to be comparatively strong. As a result, the conversion roller 35 strongly presses upon the image pattern formed from the metallic ink, thus smoothing the surface of the metallic ink layer B with more certainty.

In other words, in this embodiment, the conversion roller 35, the pressure roller 36, the linking member 38, the intermediate member 39, the coil spring 41, and the eccentric cam 42 configure a smoothing unit that smoothes the surface of the metallic ink layer B applied onto the base material film 12.

Note that the conversion roller 35 is configured of an elastic material, and therefore comes into contact with the bumps on the recording surface of the base material film 12 on which the metallic ink layer B is formed while elastically deforming in accordance therewith; accordingly, the surface of the metallic ink layer B formed upon the recording surface of the base material film 12 can be smoothed with certainty.

Figure 4:
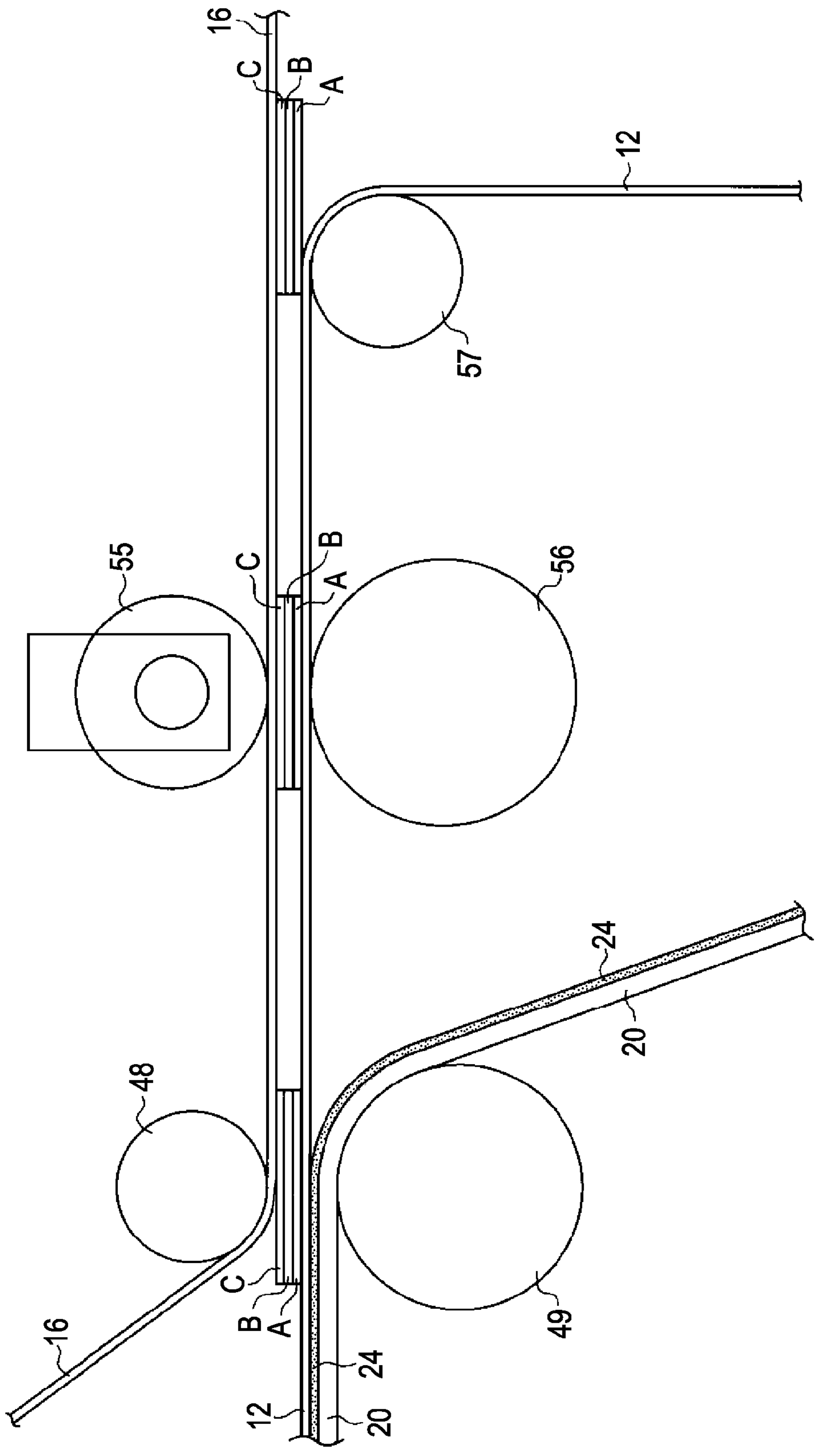
FIG. 4 is a schematic diagram illustrating a process by which an overcoat layer, a metallic ink layer, and an adhesive layer are heat-transferred from a base material film to a transfer target medium.

Next, as a reinforcement material separation step, the base material film 12 is caused to separate from the carrier film 20 while the pair of rollers 48 and 49 in the transfer section 17 press-bond the recording surface of the base material film 12, on which the overcoat layer A, the metallic ink layer B, and the adhesive layer C have been layered by the printing unit 14, against the transfer target medium 16, as shown in FIG. 4.

Note that as an adhesive force reduction step, the base material film 12 is irradiated with UV light by the UV light source 53 prior to being pinched between the pair of rollers 48 and 49. The base material film 12, meanwhile, is configured of a UV-transmissive material. The UV light irradiated onto the base material film 12 by the UV light source 53 passes through the base material film 12 and is then irradiated onto the adhesive layer 24 that bonds the base material film 12 and the carrier film 20 to each other, the adhesive layer 24 being formed of a UV delamination-type adhesive. Upon doing so, the adhesive force of the adhesive layer 24 on the base material film 12 and on the carrier film 20 drops (changes) in response to the irradiation of UV light by the UV light source 53. Accordingly, the pair of rollers 48 and 49 are capable of separating the carrier film 20 from the base material film 12 with ease.

Next, as a transfer step, the pair of transfer rollers 55 and 56 pinch the base material film 12 and the transfer target medium 16 unwound from the pair of rollers 48 and 49 while applying heat thereto. Upon doing so, the adhesive layer C formed of the adhesive liquid ejected onto the recording surface of the base material film 12 by the printing unit 14 is heated by the transfer rollers 55 and 56 into a melted state. As a result, the adhesive layer C deforms, flowing in accordance with the bumps in the adhesive surface, so as to make contact with the adhesive surface in the transfer target medium 16 that opposes the base material film 12 with no space therebetween. This in turn causes the metallic ink layer B formed of the metallic ink ejected onto the recording surface of the base material film 12 by the printing unit 14 to be strongly bonded to the transfer target medium 16 through the adhesive layer C. Accordingly, the image pattern of metallic ink, formed upon the base material film 12 by the printing unit 14, is heat-transferred to the transfer target medium 16 through the adhesive layer C.

Next, of the base material film 12 and the transfer target medium 16 unwound from the pair of transfer rollers 55 and 56, the separation roller 57 causes the base material film 12 to separate from the transfer target medium 16. Note that the overcoat layer A formed on the recording surface of the base material film 12 is configured so that its adhesive force with respect to the metallic ink layer B is greater than its adhesive force with respect to the base material film 12. As a result, when the separation roller 57 causes the base material film 12 to separate from the transfer target medium 16, the overcoat layer A to be heat-transferred onto the transfer target medium 16 is almost never separated from the transfer target medium 16 along with the base material film 12. Accordingly, when the overcoat layer A is heat-transferred onto the transfer target medium 16 along with the metallic ink layer B, the overcoat layer A covers the entire surface of the metallic ink layer B, which makes it possible to improve the friction resistivity of the metallic ink layer B.

Note that in this embodiment, the controller 44 adjusts the temperature of the heat applied by the heater 34 within the housing 33 based on results of the detection performed by the temperature sensor 43 with respect to the surface temperature of the base material film 12. Here, the surface temperature of the base material film 12 as detected by the temperature sensor 43 is an index indicating a degree whereby the metallic ink ejected from the recording head 30 is heated and dried, through the support surface 26$a$, by the heater installed within the platen 26 as the metallic ink passes over the support surface 26$a$ of the platen 26. As a result, the metallic ink ejected onto the base material film 12 by the recording head 30 of the printing unit 14 is without question in a partially-melted state at the point where that metallic ink is pinched between the conversion roller 35 and the pressure roller 36 within the housing 33 of the drying unit 15. Accordingly, the conversion roller 35 is capable of smoothing the metallic ink layer B formed of the metallic ink in a partially-melted state with certainty by pressing the metallic ink layer B against the pressure roller 36.

Furthermore, in this embodiment, the carrier film 20 is used to reinforce the base material film 12 when transporting the base material film 12. As a result, the rigidness of the base material film 12 is improved, and the base material film 12 can be suppressed from being stretched in the transport direction. Accordingly, the metallic ink can be ejected by the recording head 30 of the printing unit 14 in a desired position upon the base material film 12, thus making it possible to improve the quality of the image pattern formed of the metallic ink. In addition, because the base material film 12 and the transfer target medium 16 can be precisely positioned in the transfer section 17, it is possible to transfer the image pattern formed of the metallic ink from the base material film 12 onto a desired position on the transfer target medium 16.

In addition, in this embodiment, the configuration is such that the adhesive force of the adhesive layer 24 with respect to the carrier film 20 is greater than the adhesive force of the adhesive layer 24 with respect to the base material film 12. As a result, when the carrier film 20 is separated from the base material film 12, the adhesive layer 24 is also separated from the base material film 12 along with the carrier film 20. Accordingly, when the base material film 12 is pinched between the pair of transfer rollers 55 and 56, the adhesive layer 24 does not stick to and soil the transfer rollers 55 and 56 through the base material film 12.

According to this embodiment, the following effects can be obtained.

(1) In the aforementioned embodiment, the surface of the metallic ink layer B that is in a partially-melted state is pinched between the conversion roller 35 and the pressure roller 36, and is thus smoothed in a smooth manner. Note that the surface of the metallic ink layer B that is smoothed by the conversion roller 35 and the pressure roller 36 is the surface that makes contact with the transfer target medium 16. Accordingly, transferring the metallic ink layer B onto the transfer target medium 16 as a metallic foil makes it possible to obtain a metallic foil that has sufficient glossiness when viewed over the transfer target medium 16.

(2) In the aforementioned embodiment, when a complex image pattern is formed on the recording surface of the base material film 12 with the metallic ink, the pressing force on the conversion roller 35 from the pressure roller 36 is reduced, and the conversion roller 35 weakly presses upon the image pattern of the metallic ink formed upon the recording surface of the base material film 12; as a result, the form of the complex image pattern upon the recording surface of the base material film 12 remains almost undisturbed. On the other hand, when a simple image pattern is formed upon the recording surface of the base material film 12 with the metallic ink, the pressing force on the conversion roller 35 from the pressure roller 36 is increased, and the conversion roller 35 strongly presses upon the image pattern of the metallic ink formed upon the recording surface of the base material film 12; as a result, the surface of the metallic ink layer B can be smoothed with certainty.

(3) In the aforementioned embodiment, to what degree the metallic ink applied to the recording surface of the base material film 12 will be dried can be predicted prior to the metallic ink entering into the forced drying device 32 based on the temperature of the recording surface of the base material film 12 to which the metallic ink has been applied. The drying conditions for the metallic ink can then be set in the forced drying device 32 by referring to the results of this prediction. As a result, the metallic ink that has been applied to the recording surface of the base material film 12 can be put into a partially-melted state with certainty at the point where the metallic ink is pinched between the conversion roller 35 and the pressure roller 36.

(4) In the aforementioned embodiment, the carrier film 20 is suppressed from being stretched by the force acting as the base material film 12 follows the transport direction. Accordingly, during the transfer, the metallic ink layer B applied to the recording surface of the base material film 12 can be accurately positioned relative to the transfer target medium 16, which makes it possible to transfer the metallic ink layer B from the base material film 12 at a desired position upon the transfer target medium 16. In addition, when the carrier film 20 is separated from the base material film 12, the adhesive layer 24 located between the base material film 12 and the carrier film 20 is also separated from the base material film 12 along with the carrier film 20. Accordingly, when the transfer rollers 55 and 56 transfer the metallic ink layer B from the base material film 12 onto the transfer target medium 16, the adhesive layer 24 is suppressed from sticking to and soiling the transfer rollers 55 and 56 through the base material film 12.

(5) In the aforementioned embodiment, when the base material film 12 is being transported, the adhesive force of the adhesive layer 24 with respect to the base material film 12 and the carrier film 20 is increased, which makes it possible to prevent, with certainty, the carrier film 20 from separating from the base material film 12. On the other hand, when the carrier film 20 is separated from the base material film 12, the adhesive force of the adhesive layer 24 with respect to the base material film 12 and the carrier film 20 is reduced, thus making it possible to separate the carrier film 20 from the base material film 12 with ease. In other words, a configuration can be realized in which not only can the reliability of the strength of the base material film 12 be increased during transport, but the carrier film 20 can also be separated from the base material film 12 with ease as necessary.

(6) In the aforementioned embodiment, the carrier film 20 is separated from the base material film 12 prior to the pair of transfer rollers 55 and 56 heat-transferring the metallic ink layer B from the base material film 12 to the transfer target medium 16. As a result, no external pressure, heat, or the like acts on the carrier film 20 during transfer. Accordingly, the shape of the carrier film 20 does not distort during the transfer, which makes it possible to recycle the carrier film 20 that has been separated from the base material film 12.

Note that the aforementioned embodiment may be modified as described hereinafter.

In the aforementioned embodiment, a UV-curable ink may be employed as the metallic ink ejected onto the base material film 12 by the recording head 30 of the printing unit 14.

In this case, it is desirable to provide a UV light source, which irradiates the surface of the base material film 12 onto which the metallic ink has been applied with UV light, between the conversion roller 31 and the conversion roller 35, in order to fix the metallic ink that has been applied to the base material film 12. Furthermore, it is desirable to ensure that the metallic ink applied to the base material film 12 is in a partially-melted state at the point where the metallic ink is pinched between the conversion roller 35 and the pressure roller 36, which can be accomplished by adjusting the intensity of the UV light irradiated onto the base material film 12 by the UV light source in accordance with the application state of the metallic ink with respect to the base material film 12.

Furthermore, in this case, a thermally-melted adhesive may be used as the adhesive for bonding the base material film 12 and the carrier film 20 together. By heating the films 12 and 20 prior to the carrier film 20 being separated from the base material film 12, the carrier film 20 can be separated from the base material film 12 with ease.

In the aforementioned embodiment, a tension roller that applies tension on the base material film 12 in the direction of the conversion roller 35 may be provided between the conversion roller 31 and the conversion roller 35 in the transport path of the base material film 12 and the carrier film 20, or between the conversion roller 35 and the intermediate roller 45.

According to this configuration, the degree of the force at which the base material film 12 is press-bonded onto the conversion roller 35 is adjusted by controlling the degree of the tension applied by the tension roller on the base material film 12 in the direction of the conversion roller 35. Accordingly, the pressing force of the conversion roller 35 upon the metallic ink layer B formed upon the recording surface of the base material film 12 can be adjusted.

In the aforementioned embodiment, the pressure roller 36 may be configured so as to make contact with the recording surface of the base material film 12 on which the metallic ink layer B is formed. In this case, a support roller is provided opposite to the pressure roller 36 with the base material film 12 located therebetween, and by pinching the base material film 12 between the pressure roller 36 and the support roller, the surface of the metallic ink layer B applied to the base material film 12 can be smoothed.

In the aforementioned embodiment, the controller 44 may control the transport speed of the base material film 12 and the carrier film 20 based on results on the detection performed by the temperature sensor 43.

According to this configuration, the time required when the metallic ink ejected onto the base material film 12 by the recording head 30 of the printing unit 14 passes through a drying region of the forced drying device 32 within the housing 33 is adjusted. As a result, the amount of heat applied to the metallic ink on the base material film 12 is adjusted as the metallic ink passes through the drying region within the housing 33, and thus it can be ensured that the metallic ink is in a partially-melted state at the point where the metallic ink is pinched between the conversion roller 35 and the pressure roller 36. Accordingly, the conversion roller 35 is capable of smoothing the metallic ink layer B formed of the metallic ink in a partially-melted state with certainty by pressing the metallic ink layer B against the pressure roller 36.

In the aforementioned embodiment, the configuration may be such that the adhesive layer 24 that bonds the base material film 12 and the carrier film 20 together is formed in advance on one of the films 12 and 20. In this case, the configuration may be such that a heater for heating and melting the adhesive layer 24 is provided between the winding shaft that supports the film on which the adhesive layer 24 is formed and the pair of rollers 21 and 22.

In the aforementioned embodiment, a liquid coater unit that coats the base material film 12 with at least one of the overcoat liquid, the metallic ink, and the adhesive liquid may be provided in the printing unit 14.

In the aforementioned embodiment, the mechanism for applying the overcoat liquid to the base material film 12 may be omitted from the printing unit 14. In this case, it is desirable for the overcoat layer to be formed in advance on the recording surface of the base material film 12 onto which the metallic ink is applied.

In the aforementioned embodiment, the configuration may be such that the carrier film 20 is cyclically driven in an endless form by causing the carrier film 20 that has been separated from the base material film 12 to be taken up on the unwinding unit 13.

What is claimed is:

1. A transfer medium manufacturing apparatus comprising:

a recording material application unit that includes a foil forming recording material storage unit, the foil forming recording material containing metallic particles, the recording material application unit applying the foil forming recording material in the storage unit to a base material, the foil forming material applied to the base material being transferrable to a target medium; and a smoothing unit a smoothing unit that is located downstream of the recording material application unit so that the smoothing unit can smooth the surface of the foil forming recording material applied to the base material by the recording material application unit, wherein the smoothing unit includes:

a pressing unit capable of applying pressure to the foil forming recording material that has been applied to the base material;

a biasing unit that biases the pressing unit toward the foil forming recording material, a linking member that links the pressing unit and the biasing unit, the pressing unit being located at a first end of the linking member and the biasing unit being wound about the linking member;

a stopping portion provided at a location midway in a lengthwise direction of the linking member;

an intermediate member being located at a second end of the linking member and supporting the linking member; and an eccentric cam that provides a biasing force to the biasing unit, the intermediate member and the linking member.

2. The transfer medium manufacturing apparatus according to claim 1, wherein a biasing force applied to the pressing unit by the biasing unit is adjusted in accordance with the application state of the foil forming recording material on the base material.

3. The transfer medium manufacturing apparatus according to claim 1, further comprising:

a transport unit that transports the base material so that a region of the base material on which the foil forming recording material has been applied moves toward the smoothing unit;

a temperature detection unit, provided between the recording material application unit and the smoothing unit in a transport path of the base material, that detects the temperature of the surface of the base material on which the foil forming recording material is applied; and a drying unit, provided between the temperature detection unit and the smoothing unit in the transport path of the base material, that dries the region of the base material on which the foil forming recording material has been applied, wherein a drying condition for the foil forming recording material is set in the drying unit based on a result of the detection performed by the temperature detection unit.

4. A transfer apparatus comprising:

the transfer medium manufacturing apparatus according to claim 1; and a transfer unit that transfers the foil forming recording material from the transfer medium manufactured by the transfer medium manufacturing apparatus onto the target.

5. A transfer apparatus comprising:

the transfer medium manufacturing apparatus according to claim 2; and a transfer unit that transfers the foil forming recording material from the transfer medium manufactured by the transfer medium manufacturing apparatus onto the target.

6. A transfer apparatus comprising:

the transfer medium manufacturing apparatus according to claim 3; and a transfer unit that transfers the foil forming recording material from the transfer medium manufactured by the transfer medium manufacturing apparatus onto the target.

* * * * *